W. Walker,
Plaiting Machine.
No. 108,855.   Patented Nov. 1, 1870.
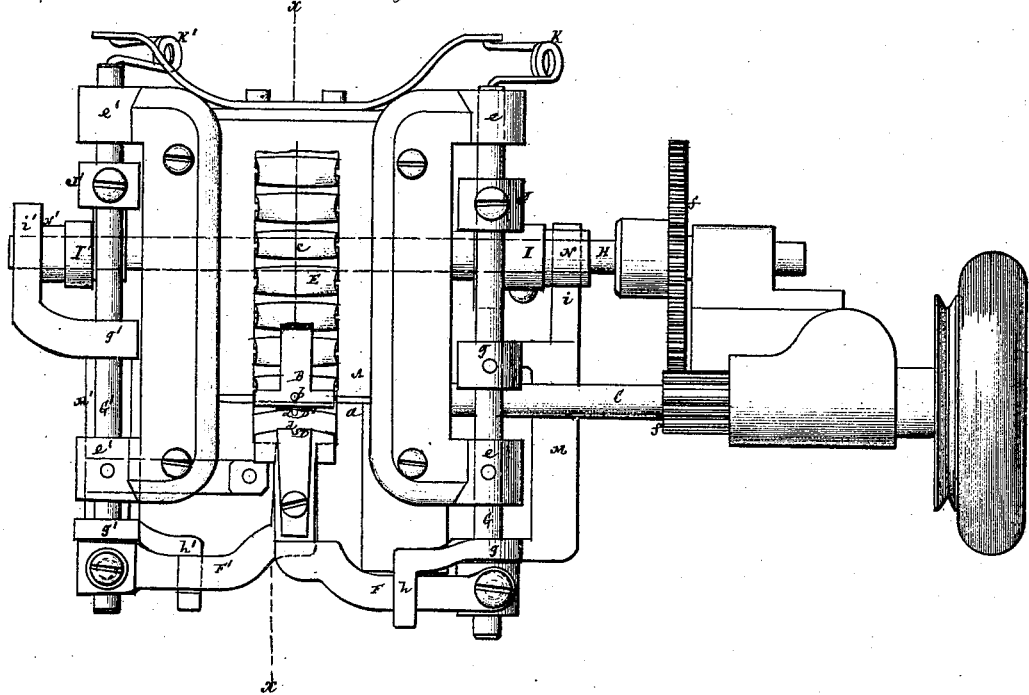
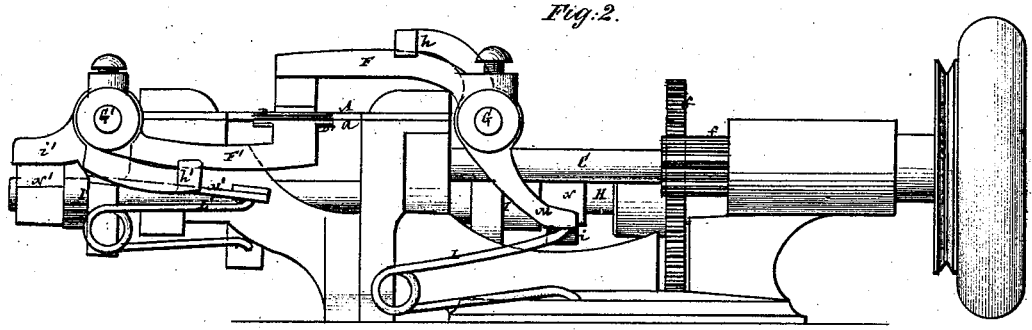
Witnesses:
Fred. Haynes
R. R. Rabeau
Wm. Walker W. Walker,
Plaiting Machine.
No. 108,855.  Patented Nov. 1, 1870.

Witnesses:
Fred. Haynes
R. G. Rabeau

Wm. Walker

UNITED STATES PATENT OFFICE.

WILLIAM WALKER, OF BROOKLYN, NEW YORK, ASSIGNOR TO GEORGE H. WOOSTER, OF NEW YORK CITY.

IMPROVEMENT IN PLAITING DEVICES.

Specification forming part of Letters Patent No. 108,855, dated November 1, 1870.

*To all whom it may concern:*

Be it known that I, WILLIAM WALKER, of Brooklyn, in the county of Kings and State of New York, have invented certain new and useful Improvements in Plaiting Devices, of which the following is a full, clear, and exact description, reference being had to the accompanying drawing, forming part of this specification, and in which—

Figure 3:
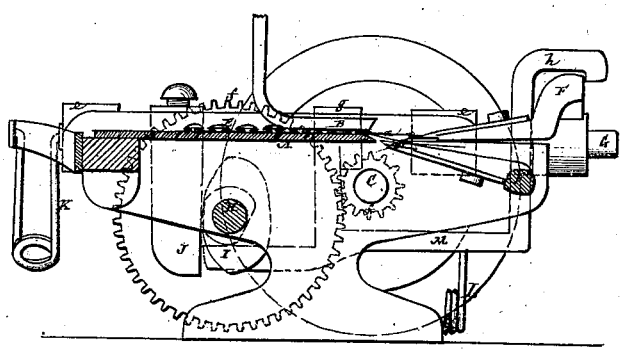
Figure 4:
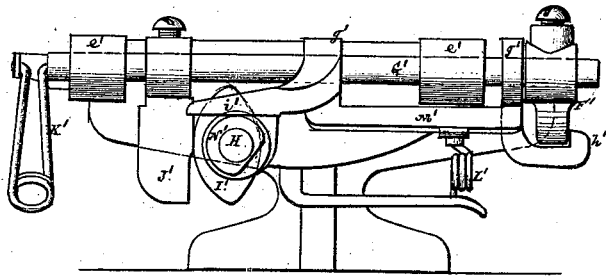

Figure 1 represents a plan of a sewing-machine, in part, with a plaiting device constructed in accordance with my invention applied thereto; Fig. 2, a front view of the same; Fig. 3, a vertical section taken as indicated by the line $x\,x$, in Fig. 1; and Fig. 4, a side elevation thereof.

Similar letters of reference indicate corresponding parts.

My invention, so far as certain features of it are concerned, is applicable either as an attachment to a sewing-machine, or as a separate device for plaiting ribbon, tape, and other ware or goods, and is not restricted to the production of any one particular form of plait, which may either be simple or box, the invention including the use of either a single plaiting-blade, or two blades, operating the one under or against the other. This latter feature—that is, the use of two plaiting-knives, working one against the other, and whereby I am enabled to produce box-plaiting—constitutes the one part of this invention, irrespective of the mode or means by which motion is communicated to the knives.

The invention also embraces a certain arrangement of parts and mode of operating a plaiting blade or blades, including a specific combination of a sliding shaft and spring-presser. Furthermore, the invention includes, in the attachment of a plaiting device to a sewing-machine, whether said device be made up of a single or two plaiting blades, a combination of gearing or driving mechanism which will so time the plaiting and sewing that several stitches are made in each plait instead of a single stitch, as has heretofore been the case.

The accompanying drawing represents a construction, combination, and arrangement of parts which serves to illustrate the several features of the invention, as hereinbefore enumerated, for the production of box-plaiting of a well-known description.

In said drawing, A represents the table of any suitable sewing-machine, which, when two plaiters are used, as hereinbefore described, may be recessed or cut away, as at $a$, to provide for the action in concert of said plaiters. B is the presser-foot of the machine, and $b$ the aperture therethrough for the passage of the needle. C is the main or looper shaft. D D' are the plaiting blades or knives, which are here shown as operating upon a strip or ribbon, E, to produce box-plaiting, the plaits of which are secured by a single line of stitching, $c$.

The knives D D' are notched, as at $d$, to allow them to work close up to the needle, and have similar but reverse actions given them to fold the material as it lies or is fed in between them, first by the one knife giving the material a turn or fold under, and then the other knife making a turn or fold over, the material having a timely feed given it relatively to the plaiting action of the knives to produce a succession of such folds, as will be readily understood by those acquainted with the action of single plaiters having their bearing on the sewing table or bed, and which first act with a spring-pressure on or over the material to produce the fold against the presser-foot when down, then lift from pressure and retire, and subsequently coming down and again moving forward to produce a succeeding fold or plait. Said knives, toward the completion of their forward stroke, move in concert with the general feed, carrying the plait under the toe of the presser-foot, and then lift from pressure and retire at the same time that the action of the general feed allows the foot to press on and hold the plait. Such is the general action of the combined plaiters D and D' successively as regards each other, but bearing one against the other, with the material in between them instead of on the bed, and the arrangement of devices and combinations of parts for communicating to the plaiters, or either of them, their necessary movements, essentially differ from those heretofore employed, affording increased convenience and possessing other advantages.

To give to the plaiters D and D' their respective motions or actions relatively to each other and to the material in between them, for the purpose of producing a box-plait, each plaiter is operated by a like combination of devices acting alternately and in concert, as hereinafter described, to give to the plaits are griping motion, as produced by spring-pressure, a forward feed, a releasing action, and a backward stroke.

The devices for accomplishing these actions are as follows: Each plaiter D or D' is secured to an arm, F or F', crooked so as to give it a cross or right-angled direction to the line of feed, which insures free access to the plaiter or plaiters for the introduction and handling of the goods; also which provides for the attachment of either arm F or F' to a shaft, G or G', arranged to work in bearings $e$ $e'$ on either side of the machine. These shafts G G', which lie parallel to the feed and out of the way of it, are made capable of having a longitudinal or sliding as well as a rocking motion, for the purpose of securing to the plaiters their necessary forward and backward and rising and falling actions. These motions of the plaiters might be taken direct from the main or looper shaft C of the sewing-machine; but to secure each plait having two or any greater number of stitches, motion for the purpose is taken from a secondary shaft, H, geared to the main shaft C, as by gears $f f$, to run at a reduced velocity to the main shaft.

The forward motions of the plaiters, alternately in reverse directions, are effected by properly-disposed cams I I' on the shaft H, made to act against toes J J' on the rocking and sliding shafts G G', while their backward strokes are secured by springs K K', bearing against the back ends of said shafts.

To give to the plaiters their hold on the goods while either plaiter is moving forward, springs L L' are permitted to act alternately on rocking frames M or M', having their bearings, as at $g g'$, on the shafts G G', and formed with arms $h h'$, which, when the springs L L' are in action, bear against the arms F F' to induce gripe of either plaiter respectively and alternately on the goods.

To release either plaiter alternately, when making its back stroke, from such spring-pressure, either rocking frame M or M' is rocked or acted upon in a reverse direction to that produced by the springs L L', so as to release its arm $h$ or $h'$ from pressure against the plaiter-arm F or F', by means of cams N N', appropriately shaped and arranged on the revolving shaft H, to act alternately against legs $i$ $i'$ of the rocking frames M M'.

The plaiters D D' have here been described as operating upon the goods to produce a single plait on opposite sides of the material alternately; but, if desired, the one plaiter may be made to produce two folds or plaits in succession upon the same side of the strip, and then the other plaiter be made to do the same upon the opposite side thereof, each plaiter working one against the other, as hereinbefore described, only having two strokes or succeeding actions each in the place of one.

What is here claimed, and desired to be secured by Letters Patent, is—

1. The arrangement of the plaiter D or D', with its arm or arms F F' and rocking shaft or shafts G G', relatively to the line of feed, substantially as specified.

2. The combination, with a plaiter, D or D', operating by spring-pressure, of a sliding and rocking shaft, G or G', for securing to said plaiter both its forward or plaiting stroke and its release from hold on the goods when retiring, essentially as herein set forth.

3. The combination of the rocking frame M or M', the sliding and rocking shaft G or G', the cams I or I' and N or N', the springs K or K' and L or L', and the arm F or F' of the plaiter D or D', substantially as specified.

4. The combination, for the purpose of making plaiting, of two knives or plaiters, D D', arranged for reciprocal operation in relation to each other, substantially as specified.

5. The combination, with the plaiting device attached to a sewing-machine, of a secondary shaft, operated by the main shaft of the machine, and made to run at a slower velocity than said secondary shaft, essentially as and for the purpose set forth.

WM. WALKER.

Witnesses:
FRED. HAYNES,
R. E. RABEAU.